(12) United States Patent
Theogaraj et al.

(10) Patent No.: US 10,855,575 B2
(45) Date of Patent: Dec. 1, 2020

(54) ADAPTIVE TRAFFIC ROUTING IN A SOFTWARE-DEFINED WIDE AREA NETWORK

(71) Applicant: HEWLETT PACKARD ENTERPRISE DEVELOPMENT LP, Houston, TX (US)

(72) Inventors: Isaac Theogaraj, Bangalore (IN); Manjunatha Gs, Bangalore (IN); Sivappirakasam Muthiah, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/294,392

(22) Filed: Mar. 6, 2019

(65) Prior Publication Data

US 2020/0287819 A1    Sep. 10, 2020

(51) Int. Cl.
*H04L 12/721*     (2013.01)
*H04L 12/771*     (2013.01)
*H04L 12/741*     (2013.01)
*H04L 12/717*     (2013.01)

(52) U.S. Cl.
CPC .......... *H04L 45/124* (2013.01); *H04L 45/42* (2013.01); *H04L 45/56* (2013.01); *H04L 45/70* (2013.01); *H04L 45/74* (2013.01)

(58) Field of Classification Search
CPC ....... H04L 45/124; H04L 45/42; H04L 45/70; H04L 45/74; H04L 45/56; H04L 67/1008; H04L 67/1002; H04L 67/2814
See application file for complete search history.

(56) References Cited

U.S. PATENT DOCUMENTS

| 9,929,800 | B2 | 3/2018 | Anand et al. | |
| 2012/0059934 | A1* | 3/2012 | Rafiq | H04L 67/1002 |
| | | | | 709/225 |
| 2014/0280969 | A1* | 9/2014 | Wood | H04L 47/125 |
| | | | | 709/226 |
| 2017/0111233 | A1 | 4/2017 | Kokkula et al. | |
| 2017/0347363 | A1* | 11/2017 | Roy | H04W 28/0268 |

OTHER PUBLICATIONS

Beijing University of Posts and Telecommunications Beijing China, An Adaptive Dynamic Feedback Load Balancing Algorithm Based on QoS in Distributed File System, Sep. 2017, pp. 1-7, Retrieved from the Internet on Oct. 15, 2018 from URL: <link.springer.com/article/10.1007/s41650-017-0029-3>.

(Continued)

*Primary Examiner* — Dady Chery
(74) *Attorney, Agent, or Firm* — McDermott Will & Emery

(57) ABSTRACT

A network orchestrator may receive from a branch gateway (BG) an indication that the BG has joined a wide area network (WAN). The network orchestrator may assign, based in part on first load information of a first virtual internet gateway (VIG) and second load information of a second VIG, the first VIG as a primary VIG for the BG. The network orchestrator may also transmit a first redistribution cost to the first VIG. The network orchestrator may also transmit a second redistribution cost that is greater than the first redistribution cost to the second VIG.

10 Claims, 4 Drawing Sheets

(56) References Cited

OTHER PUBLICATIONS

Citrix Product Documentation, Active-active Site Deployment, Aug. 23, 2018, pp. 1-2, Retrieved from the Internet on Oct. 15, 2018 from URL: <docs.citrix.com/en-us/netscaler/12-1/global-server-load-balancing/deployment-types/active-active-site-deployment.html >.

College of Computer Science and Technology, Jilin University, Agent-based Dynamic Adaptive Cluster Load Balancing Model, Mar. 2014, pp. 1-11, Retrieved from the internet on Oct. 15, 2018 from URL: <iaescore.com/journals/index.php/IJEECS/article/download/3221/1364>.

Palestine Polytechnic University, Server Load Prediction Based on Dynamic Neural Networks, pp. 1-13, Retrieved from the Internet on Oct. 15, 2018 from URL: <researchgate.net/publication/266064454_Server_Load_Prediction_Based_on_Dynamic_Neural_Networks>.

Round Trip Time Prediction using the Symbolic Function Network Approach, Jul. 2008, pp. 1-6, Retrieved from the Internet on Oct. 15, 2018 from URL: <researchgate.net/publication/1738065_Round_Trip_Time_Prediction_Using_the_Symbolic_Function_Network_Approach>.

School of Information Science and Engineering, Lanzhou University, Dynamic Server Cluster Load Balancing in Virtualization Environment with Openflow, Aug. 8, 2014, pp. 1-9, <journals.sagepub.com/doi/pdf/10.1155/2015/531538>.

Belhaj et al., "Modeling and Prediction of the Internet End-to-end Delay using Recurrent Neural Networks", Aug. 2009, Journal of Networks, vol. 4, No. 6, pp. 528-535.

Chen et al., "Dynamic Server Cluster Load Balancing in Virtualization Environment with OpenFlow", Research Article, Hindawi Publishing Corporation, International Journal of Distributed Sensor Networks vol. 2015, Article ID 531538, Sep. 8, 2014, pp. 1-9.

HPE, "Aruba SD-branch", Sep. 13, 2018, available online at <https://web.archive.org/web/20180913075443/https://www.arubanetworks.com/solutions/sd-branch/>, 4 pages.

HPE, "Aruba SD-WAN", Jul. 27, 2018, available online at <https://web.archive.org/web/20180727233720/https://www.arubanetworks.com/products/networking/sd-wan/>, 3 pages.

Wang et al., "Dynamic Adaptive Feedback of Load Balancing Strategy", Oct. 2011, Journal of Information & Computational Science, vol. 8, No. 10, pp. 1901-1908.

You et al., "Performance Evaluation of Dynamic Load Balancing Algorithms", Apr. 2014, TELKOMNIKA Indonesian Journal of Electrical Engineering, vol. 12, No. 4, pp. 2850-2859.

\* cited by examiner

ADAPTIVE TRAFFIC ROUTING IN A SOFTWARE-DEFINED WIDE AREA NETWORK

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites of the WAN. Networking infrastructure, such as switches and routers, are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and virtual internet gateways (VIGs, also known as head-end gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and VIGs) controls certain aspects of routing for their respective LAN, but a network orchestrator controls the overall switching and routing across the WAN. In some other SD-WAN implementations, the network orchestrator controls all switching and routing in the WAN and in each LAN by sending control messages to compatible network infrastructure devices (including the BGs and VIGs) across the WAN.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
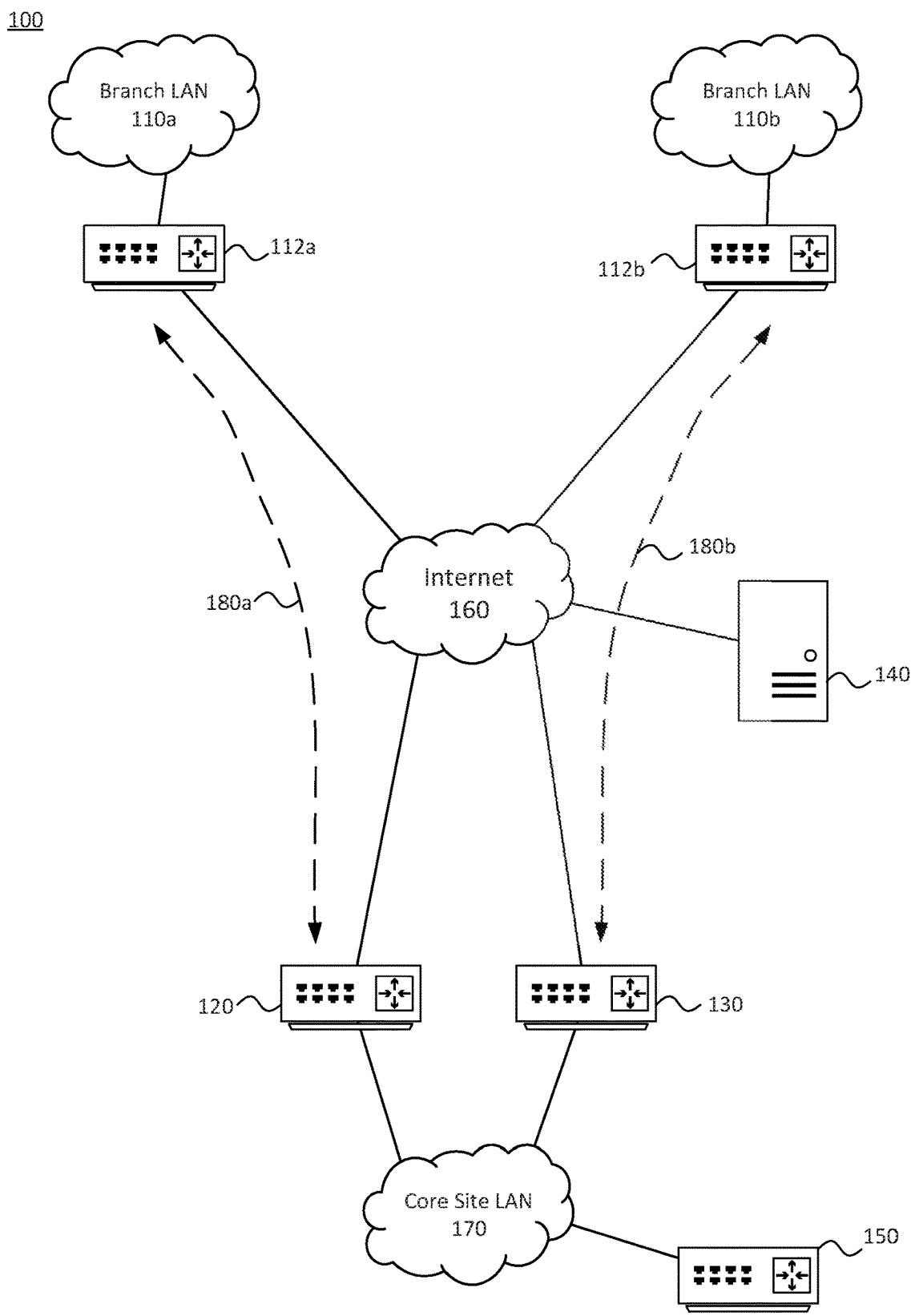
FIG. 1 illustrates an example software defined wide area network (SD-WAN) including a core site LAN and a branch LAN.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

In a Software-Defined Wide Area Network (SDWAN) configuration, branch gateways (BGs) connect to virtual internet gateways (VIGs) via one or more secure connections. These connections may be dedicated links such as multiprotocol label switching (MPLS) links, or they may be shared links such as secure virtual private networking (VPN) tunnels across the Internet. Multiple connections may be made between a certain BG and a certain VIG to provide redundancy in case of link failure (among other benefits). Similarly, a site may include multiple gateways to provide redundancy in case one of the gateways fails. Certain branch sites may be small enough that a single BG is used because failure of the BG would not impact the operation of the WAN enough to warrant a redundant BG. However, in comparison, it is much more likely that VIG failure at a core site of the WAN would have a large impact on the operation of the WAN. VIG redundancy is common in most large WANs.

In many current WANs, the redundant VIGs at a core site are configured in an "active-standby" mode, where one or more VIGs are actively transceiving data, and one or more VIGs are idly standing by, waiting for a failover condition if one or more active VIGs fail. Network infrastructure in the core site LAN, such as a core router in an OSPF backbone, as well as gateways in other sites, such as BGs at each branch, are configured to route their data through the active VIG (also known as the primary VIG) and retain the information of the standby VIG (also known as the secondary VIG) in case their connection to the primary VIG fails.

Core site LANs may be configured in a network topology that includes a network backbone and other network zones. One such example routing paradigm is open shortest path first (OSPF). In some WAN networks, the routing paradigm used in the core site LANs is not used across the larger WAN or in other (e.g. branch) site LANs.

The WAN may include a network orchestrator to configure switching and routing across the WAN. In some examples, the network orchestrator operates in a core site of the WAN. In some other examples, the network orchestrator operates in the cloud. The network orchestrator may communicate with command layers of each of the gateways as well as other switching and routing infrastructure throughout the WAN. The network orchestrator cannot communicate with the command layers of network infrastructure outside the WAN that is being used to forward network traffic between sites of the WAN (i.e. Internet routers and switches that are not controlled by the administrator of the WAN). The network orchestrator creates and deploys routes for certain network traffic to follow. For example, data from a resource in a core site that is destined for a client device on a branch site may be routed through the core site LAN to a primary VIG, through a secure tunnel across the Internet to a BG at the branch site, and through the branch site LAN to the client device.

One of the benefits of a SD-WAN system is that alterations to the network topology can be implemented with reduced manual configuration from the network administrator. For example, when a branch gateway joins the network, the branch gateway can be automatically assigned a primary VIG and a secondary VIG by the network orchestrator. In many current WAN topologies, a single primary VIG is statically assigned for all branches and a single secondary VIG is statically assigned for all branches. The primary VIG transceiver all relevant network traffic, and the secondary VIG is idle until and unless the primary VIG or connections between a BG and the primary VIG fail.

In examples consistent with this disclosure, redundant VIGs are operated in an "active-active" configuration. Rather than configuring a single primary VIG and a single secondary VIG, each connection with a branch is separately assigned a primary VIG and a secondary VIG, so that network traffic is balanced across the VIGs. The network orchestrator may use operating information received from each of the VIGs and from the network as a whole to assign primary and secondary VIGs. For example, the network orchestrator may take into account factors such as number of branches assigned to a certain VIG as the primary VIG and workload of a certain VIG.

Likewise, the network orchestrator may also configure the core site LAN to route traffic through a branch's primary VIG when the traffic is destined for a device on the branch. For example, in cases where the core site LAN is configured as an OSPF network, the network orchestrator sets the re-distribution costs in the OSPF so that the backbone network (including the core router) prefers to send traffic to a certain branch via a route through the branch's primary VIG. The network orchestrator may generate a route to a branch, based on network topology, including the assignment of a primary VIG, using multiple protocols (e.g. OSPF for backbone network, SD-WAN flow protocol for secure tunnels, etc.).

Embodiments as disclosed herein improve the technical functioning of the network infrastructure of certain WANs by using capacity and bandwidth of all deployed VIGs. Examples described in this disclosure provides a technical solution, namely dynamically routing the network traffic (e.g., dynamic adaptive routing), that improves latency and throughput of data from a core site LAN to branch site LANs of a WAN. Examples of this disclosure enable the WAN to dynamically route traffic based on the load condition of the VIGs by connecting a BG to a least congested VIG to balance the overall network traffic load across the deployed VIGs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Example System Architecture

FIG. 1 illustrates an example software defined wide area network (SD-WAN) including a core site local area network (LAN) 170 and branch LANs (represented in FIG. 1 by branch gateways 110-1 to 110-n). SD-WAN 100 may be a corporate network, an institutional intranet, or any other sufficiently complex managed computer network. SD-WAN 100 includes multiple LANs, partitioned geographically (e.g. various office sites of the organization), functional (e.g. groups with special security or bandwidth needs), or logical (e.g. sections or regions of a large campus, such as a headquarters). A person having ordinary skill in the art will have knowledge of the various reasons and methods for partitioning a SD-WAN into LANs.

SD-WAN 100 includes branch LANs 110a and 110b, and core site LAN 170. SD-WAN 100 is administered by network orchestrator 140 which is connected to the sites of SD-WAN 100 through Internet 160. Sites (e.g. branch LANs 110, core site LAN 170) of SD-WAN 100 are communicatively coupled through Internet 160. The communication links between the sites of SD-WAN 100 may be connected by one or more networking technology, including secure tunnels across Internet connections (e.g. IPSec VPNs), dedicated communication links (e.g. MPLS), or any other appropriate technology.

Core site LAN 170 is a network site of SD-WAN 100 that includes network resources to provide services and applications to network client devices. Although branch LANs 110 may include network resources to provide services and applications (e.g. edge computing), a core site LAN 170 includes a concentrated number of network resources accessible to sites across SD-WAN 100. In some examples, core site LAN 170 is a headquarters site or a datacenter site. Core site LAN 170 includes a core router 150 to route packets within core site LAN 170. In some examples, multiple network infrastructure devices (e.g. switches, routers) are interconnected to route packets within core site LAN 170. All features of this disclosure described in relation to core router 150 may be applicable to all network infrastructure devices of core site LAN 170, as appropriate. Core site LAN 170 also includes virtual internet gateways (VIGs) 120 and 130. VIGs (also known as headend gateways) connect core site LAN 170 to the wider network (e.g. Internet 160, SD-WAN 100). VIGs 120 and 130 establish connections with one or more branch LANs 110, respectively.

Branch LANs 110 are sites of SD-WAN 100 that are partitioned from core site LAN 170. As mentioned herein, Branch LANs 110 may be partitioned for many reasons, including geographical distance, functional difference, or logical separation. In some examples, branch LANs 110 are satellite offices, retail storefronts, or other remote facilities of an organization. Branch LANs 110 may include wired and wireless devices such as point of sale devices, internet of things devices, employee wired and wireless computing devices, etc. Certain data from branch LANs 110 may have a destination of core site LAN 170, another branch LAN 110, or Internet 160. Depending on the specific topology of SD-WAN 100, such data may be routed in one of a variety of ways that would be clear to a person having ordinary skill in the art. One example includes routing all data packets through core site LAN 170 before they reach their destination in order to perform certain network functions (e.g. firewall, analytics) using resources of core site LAN 170. Branch LANs 110 are connected to the wider network (e.g. Internet 160, SD-WAN 100) through branch gateways 112. Branch gateways 112 establish connections with core site LAN 170 through VIGs 120 and 130. Each branch gateway 112 may establish multiple connections with core site LAN 170.

Although FIG. 1 illustrates a single core site LAN 170 and two branch LANs 110, this is only a simple example of a topology of SD-WAN 100 used for clarity of the concepts herein. It would be clear to a person having ordinary skill in the art that SD-WAN 100 could be configured in one of many different topologies, including topologies with any number of core site LANs 170, any number of VIGs 120 and 130, any number of branch LANs 110, any number of branch gateways 112, any number of connection links, etc.

Network orchestrator 140 controls routing of packets throughout SD-WAN 100. Network orchestrator 140 connects to VIGs 120 and 130, and branch gateways 112 to control the routing of packets that pass through each respective gateway. In some examples, network orchestrator 140 is executed on a cloud device. In some other examples, network orchestrator 140 is executed on a server device of core site LAN 170. In yet other examples, network orchestrator 140 is executed on a controller device of core site LAN 170. Network orchestrator 140 may be located in any appropriate network location and executed in any appropriate manner consistent with the operation of SD-WAN 100. Network orchestrator 140 sends routing flow information to VIGs 120 and 130 and to branch gateways 112 to modify the gateways' operation. In some examples, network orchestrator 140 sends the routing flow information through out-of-band control links between network orchestrator 140 and the respective gateway. In some other examples, network orchestrator 140 sends the routing flow information through in-band data links between network orchestrator 140 and the respective gateway. In certain examples, the routing flow information includes information about routing data within core site LAN 170 and/or branch LANs 110. In certain such examples, the respective gateway for each affected LAN may forward relevant portions of the routing flow information to LAN controllers (not shown) in the respective LAN. In certain other such examples, network orchestrator 140 may forward the routing flow information to the network infrastructure devices of each affected LAN, such as core router 150. In yet other such examples, network orchestrator 140 may forward the routing flow information to the respective gateway for each affected LAN, and LAN controllers for each respective LAN calculate LAN routing rules in accordance with the routing flow information from network orchestrator 140. A person having ordinary skill in the art will recognize that there are many methods for disseminating routing flow information across SD-WAN 100 within the spirit and scope of this disclosure.

Internet 160 represents multiple links that connect sites of SD-WAN 100 via one or more technologies and via one or more service providers. Internet 160 is not fully controlled or administered by the administrator of SD-WAN 100. Due to the public and uncontrolled nature of Internet 160, example implementations of SD-WAN 100 use secure tunnels between sites or dedicated links between sites to improve security and reliability of SD-WAN 100.

In an example operation of SD-WAN 100, during initialization of branch LAN 110a, branch LAN 110a is connected to core site LAN 170 by assigning VIG 120 as a primary VIG for branch gateway 112a. With VIG 120 as the primary VIG for branch LAN 110a, packets exchanged between core site LAN 170 and branch LAN 110a follow route 180a through VIG 120 and branch gateway 112a. Network orchestrator 140 may gather network information regarding SD-WAN 100, including topology information, device load information, and number of branches assigned to each VIG to determine which VIG to assign to currently initializing branch LAN 110a. For example, if eight of the previously existing ten branches are all assigned VIG 130 as primary VIG, network orchestrator 140 may assign branch LAN 110a to VIG 120 to reduce the skew of assigned branches between VIG 120 and VIG 130. Although there are many ways to assign VIG 120 as primary VIG to branch LAN 110a, in one common method, network orchestrator 140 transmits a network flow route to branch gateway 112a that routes all traffic with a destination in core site LAN 170 through a communication link that terminates at VIG 120. In such a method, network orchestrator 140 also transmits a network flow route to VIG 120 that routes all traffic with a destination of branch LAN 110a through a communication link that terminates at branch gateway 112a. In some examples, network orchestrator 140 transmits a network flow route to core router 150 so that data traffic within core site LAN 170 and with a destination of a device on branch LAN 110a is directed to VIG 120 in order to be forwarded across route 180a.

In further description of the example operation of SD-WAN 100 from the preceding paragraph, during initialization of branch LAN 110b, branch LAN 110b is connected to core site LAN 170 by assigning VIG 130 as a primary VIG for branch gateway 112b. With VIG 130 as the primary VIG for branch LAN 110b, packets exchanged between core site LAN 180 and branch LAN 110b follow route 180b through VIG 130 and branch gateway 112b. Using gathered information from across SD-WAN 100, network orchestrator 140 determines that it is beneficial to assign VIG 130 as the primary VIG for branch LAN 110b. For example, if branch LAN 110a is the only pre-existing branch on SD-WAN 100 and branch LAN 110a has VIG 120 assigned as the primary VIG, network orchestrator 140 may detect that the load on VIG 130 (which has no branches assigned) is less than the load on VIG 120 (which has branch LAN 110a assigned), and thus assign VIG 130 as the primary VIG for branch LAN 110b.

In some examples, branch gateways 112 each establish multiple uplinks to core site LAN 170. These multiple uplinks may include multiple logical connections originating from the same physical port on the respective branch gateway 112 and multiple physical connections each originating from separate physical ports on the respective branch gateway 112. In such examples, network orchestrator 140 assigns a secondary VIG to each respective branch gateway 112. In an SD-WAN 100 where VIG 120 is primary VIG to branch LAN 110a and VIG 130 is primary VIG to branch LAN 110b, network orchestrator 140 may assign VIG 130 as secondary VIG to branch LAN 110a and may assign VIG 120 as secondary VIG to branch LAN 110b. In a situation where a connection is severed between a branch LAN 100 and a primary VIG, data can still be transacted between the branch LAN and the core site LAN via the secondary VIG. It is important to recognize that the assignment of primary and secondary VIGs to a branch LAN may not be the only form of protection in place to protect the connection between the branch LAN and the core site LAN. Other redundancies and failover routes may be in place for situations where links between the branch gateway 112 and the primary and secondary VIGs are severed. In some examples, branch LANs 110a-b may load balance their WAN connections across multiple uplinks from branch gateways 112a-b, and across redundant branch gateways 112 (not shown) in each branch LAN 110. In such examples, primary and secondary VIGs may be assigned on a per-branch gateway or per-uplink basis.

Network orchestrator 140 dynamic adapts routing paths between branch gateways 110 and VIGs 120 and 130 as new branches are added to the networks. Network orchestrator 140 collects and analyzes data from SD-WAN 100 to make a VIG assignment determination dynamically when each new branch is added to the network. In some examples, rather than just take a snapshot of contemporaneous network conditions, network orchestrator 140 may incorporate operating history information and network topology information into an algorithm to determine which VIG to assign to the new branch as primary VIG. In some examples, network orchestrator 140 may, at the time when a new branch is added, re-shuffle the assignments of primary VIGs for previously added branches to more properly balance the load between VIGs.

VIGs 120 and 130 collect load information. Based on the load information provided to network orchestrator 140 from each VIG, the network orchestrator 140 may dynamically assign each new branch a primary VIG with the most available capacity. Each VIG may collect networking load information including operating capacity (operating below capacity, at capacity, or above capacity), operating performances (operating performance is below a critical value, at a critical value, or above a critical value), operational efficacy, and the like. In some embodiments, the VIGs may collect system load information, including computing processing unit (CPU) utilization, a memory utilization, a data throughput, and a data latency, and the like, of the VIG. Measurement points of load information may be collected periodically (e.g., every three minutes), continuously, on interrupt (e.g. counting each time CPU usage spikes above 85%), or in any other appropriate manner.

The load information for a certain VIG 120 or 130 is used to calculate a load factor for the VIG. In some examples, the VIG 120 or 130 calculates the load factor and forwards the load factor to network orchestrator 140. In some other examples, the VIG 120 or 130 forwards the load information to network orchestrator 140 and network orchestrator 140 calculates the load factor for the VIG 120 or 130. As an example, load factor may be calculated by the following equation:

$$\text{Load Factor } (LF) = (\tfrac{1}{3}) \text{ CPU load } (\%) + (\tfrac{1}{3}) \text{ memory usage } (\%) + (\tfrac{1}{3}) \text{ data throughput } (\%) \quad \text{Equation (1)}$$

In some examples, load factor for a certain VIG 120 or 130 may be calculated at the time that load information for the VIG 120 or 130 is collected. For example, if load information is collected at five minute intervals, load factor for VIG 120 or 130 may be calculated at the same five minute intervals. In some other examples, load factor for VIG 120 or 130 may be calculated independent of the load information collection interval. For example, load information may be collected at five minute intervals, but load factor is calculated on demand when a new branch is added to the network. It will be clear to a person having ordinary skill in the art that any regime of intervals for calculating load factor, whether it be repetitive or ad-hoc, is consistent with this disclosure.

Dependent on the specific functionality of the network, VIGs 120 and 130 may communicate either their load factors or load information to the network orchestrator 140. VIGs 120 and 130 may communicate the load factors or load information at an interval or in an ad-hoc manner as requested by network orchestrator 140. In an example, VIGs 120 and 130 may communicate the load factors to the network orchestrator 140 at time intervals of every five minutes. The time interval is not limited in this regard, and embodiments disclosed are equally applicable to a network that includes a time interval of less than or more than five minutes, as well as to repetition that is ad-hoc, interrupt-based, or triggered by any other appropriate event transpiring.

The network orchestrator 140 may be implemented by one or more computing devices or systems in some embodiments, such as a computing system 500 described in FIG. 5. The network orchestrator 140 may also be provided as a service from a cloud provider or a WAN provider. In some examples, network orchestrator 140 may be located in core site LAN 170. The network orchestrator 140 obtains the load factors of VIGs 120 and 130. In some examples, network orchestrator 140 receives load information from each of the VIGs and computes a load factor for the respective VIG based on the load information. In other examples, network orchestrator 140 receives calculated load factors from each respective VIG.

The network orchestrator 140 then assigns one the VIGs as a primary VIG for a branch gateway of a newly added branch, and another VIG as a secondary VIG for the branch gateway of the newly added branch LAN. In some embodiments, the network orchestrator 140 performs the VIG assignments at the time when the branch LAN joins SD-WAN 100. For example, branch gateway 112*a* may, when initially configured during setup of branch LAN 110*a*, establish a secure tunnel with network orchestrator 140 through Internet 160. Network orchestrator 140 (or other initialization services co-located with network orchestrator 140) may transmit configuration information through the tunnel to branch gateway 112*a*. This configuration information may include a primary VIG assignment and a secondary VIG assignment. Network orchestrator 140 may determine which VIG 120 or 130 to assign to branch LAN 110*a* based on load information and/or load factors previously (or concurrently) obtained from VIGs 120 and 130, as well as the primary VIG and secondary VIG assignments for already initialized branch 110*b*.

Network orchestrator 140 may assign primary VIG and secondary VIG for a branch by transmitting routes to the relevant branch gateway and to the relevant VIGs that accomplish the behavior of having LAN traffic prefer to pass through the proper WAN uplink to pass between the primary VIG and the branch gateway. For example, network orchestrator 140 may send a command (e.g. a flow) to branch gateway 112*a* that directs branch gateway 112*a* to forward all traffic with IP addresses allocated to core site LAN 170 through the uplink connection terminating at VIG 120. The command from network orchestrator 140 may, in some examples, direct branch gateway 112*a* to forward packets destined for certain subnets (e.g. subnets associated with core site LAN 170) through a specific port of branch gateway 112*a* that is the port terminating the connection with VIG 120. For example, network orchestrator 140 may also send commands to VIG 120 and VIG 130 that adjust the open shortest path first (OSPF) redistribution cost for VIG 120 to be less than the OSPF redistribution cost for VIG 130 for certain subnets (e.g. subnets associated with branch LAN 110*a*). VIGs 120 and 130 may then transmit a routing update message to core site LAN 170 including the adjusted redistribution costs. Resultantly, core router 150, which is an OSPF neighbor of VIG 120 and VIG 130, will prefer to route packets with destination IP addresses within a range associated with branch LAN 110*a* through VIG 120. If issues arise with the connection between branch gateway 112*a* and VIG 120, core router 150 and the other routing infrastructure of core site LAN 170 will fall back to using VIG 130 to transmit packets to branch LAN 110*a*.

Although the assignment of VIGs to a new branch has been described in relation to load factors, in some examples network orchestrator 140 may establish thresholds within which load factors are used to determine assignment of VIGs. Outside of the thresholds, network orchestrator 140 may use a different method for assignment of VIGs. For example, network orchestrator 140 may determine a skew between a number of branch LANs 110 connected to each VIG 120 and 130. When the determined skew is more than a threshold (e.g., 50%), the network orchestrator 140 relies on the numbers of previously existing branch LANs 110 assigned to each VIG to assign a primary VIG and a secondary VIG to a newly initialized branch LAN 110a. For example, if seven branch LANs 110 have VIG 120 assigned as primary VIG, and two branch LANs 110 have VIG 130 assigned as primary VIG, since the determined skew (seven branches versus two branches is a skew of five branches) is more than 50% of the total number of branches (nine total branches), the network orchestrator 140 assigns VIG 130 as primary VIG for newly initialized branch LAN 110a. In other words, when the determined skew is less than a threshold, the network orchestrator 140 assigns VIGs to branches based on the load factors and when the determined skew is greater than the threshold, network orchestrator assigns VIGs to branches in a manner that reduces the skew.

Figure 2:
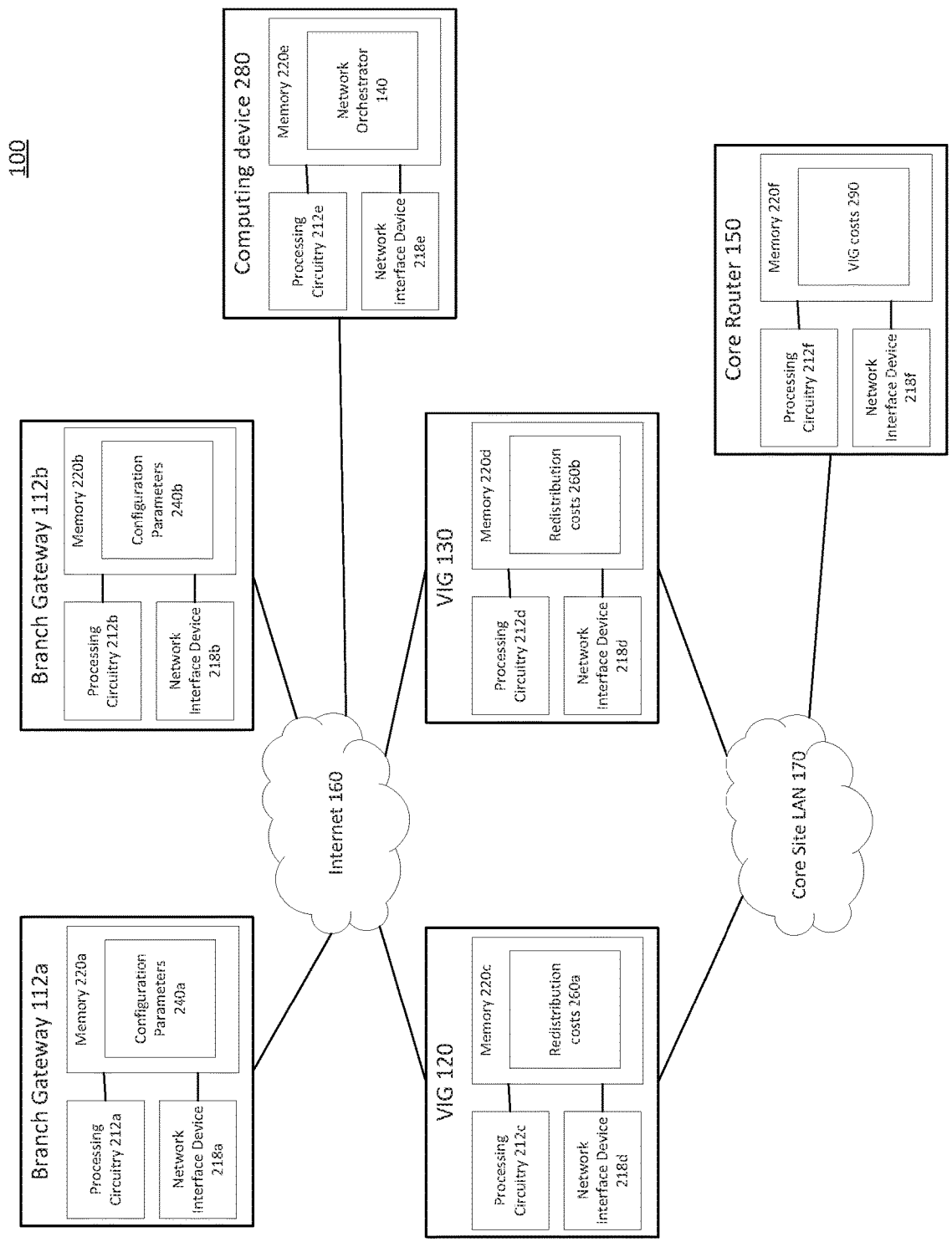
FIG. 2 is a detailed view of some of the hardware components in the SD-WAN of FIG. 1, according to some embodiments.

FIG. 2 is a detailed view of some of the hardware components in SD-WAN 100, according to some embodiments. The core router 150 is coupled to VIGs 120 and 130 through core site LAN 170. The network orchestrator 140 is executed on computing device 280, which, in the examples of FIG. 2, is a cloud device. VIGs 120 and 130 are coupled to computing device 280 and to branch gateways 112 via Internet 160.

In examples consistent with FIG. 2, each device (branch gateways 112a-b, VIGs 120-130, core router 150, computing device 280) includes processing circuitry 212, a network interface device 218, and memory 220. Each device may operate in a common manner of processing circuitry 212 retrieving instructions from memory 220 and executing those instructions. Certain instructions in each respective memory 220 may, when executed by processing circuitry 212, access data stored in memory 220 or in other storage (not shown). Certain instructions in each respective memory 220, when executed by processing circuitry 212, may utilize network interface device 218 to transceive data across a network.

Processing circuitries 220 may be any appropriate processing circuitry, including one or more CPUs, ASICs, FPGAs, microcontrollers, SoCs, virtualized processors, etc. Network interface devices 218 may be any appropriate devices, circuitry, or components (e.g. NICs, wireless antennae, modems, Ethernet cards, virtualized network interfaces) that are configured to interface with other devices of SD-WAN 100 to send and receive information, such as data packets, requests, responses, and commands. Memories 220 may include system memory (e.g. processor cache, RAM, ROM, etc.) as well as storage (e.g. HDD, SSD, NAS, etc.) and virtualized memory and storage that can store instructions and data.

Branch gateways 112 may store configuration parameters 240 in memories 220. Configuration parameters 240 may include reference to assigned VIGs, such as a primary VIG and a secondary VIG. For example, branch gateway 112a may include a configuration parameter 240a referencing VIG 120 as a primary VIG and another configuration parameter 240a referencing VIG 130 as a secondary VIG. Similarly, branch gateway 112b may include a configuration parameter 240b referencing VIG 130 as a primary VIG and another configuration parameter 240b referencing VIG 120 as a secondary VIG.

VIG 120 and VIG 130 may store redistribution costs 260 in memories 220. Redistribution costs 260 may include reference to specific branch LANs through subnets associated with those branch LANs, such as a redistribution cost for subnets associated with the branch LAN of branch gateway 112a. For example, VIG 120 may include a redistribution cost 260a of 10 for subnet 174.28.100.0/24, where devices on SD-WAN 100 with IP addresses between 174.28.100.0 and 174.28.100.255 are located on the branch LAN associated with branch gateway 112a. Similarly, VIG 130 may include a redistribution cost 260b of 15 for subnet 174.28.100.0/24, such that core router 150 and other network infrastructure of core site LAN 170 prefers to route traffic for subnet 174.28.100.0/24 through VIG 120. VIGs 120 and 130, once assigned redistribution costs 260 from network orchestrator 140, may send advertisements to network infrastructure devices of core site LAN 170, including core router 150.

Core router 150 may store VIG costs 290 in memory 220f. In some examples, VIG costs 290 are entries in a larger routing table for devices of the wider network. Core router 150 may, from time to time, receive advertisements from VIG 120 and VIG 130 including redistribution costs 260 for certain subnets. When core router 150 receives a data packet, it may check the routing table including VIG costs 290, and if the data packet has a destination IP address within a subnet of a branch LAN, will forward the data packet through the primary VIG for that branch LAN. For example, if core router 150 receives a packet destined for a device with address 174.28.100.41, the routing table of core router 150 may indicate that there are two next-hops available for that packet. One next hop is to VIG 120 with a cost of 10, and another next hop is to VIG 130 with a cost of 150. Core router 150 may then forward the packet to VIG 120. VIG 120 may then forward the packet through a secure tunnel to branch gateway 112a.

Figure 3:
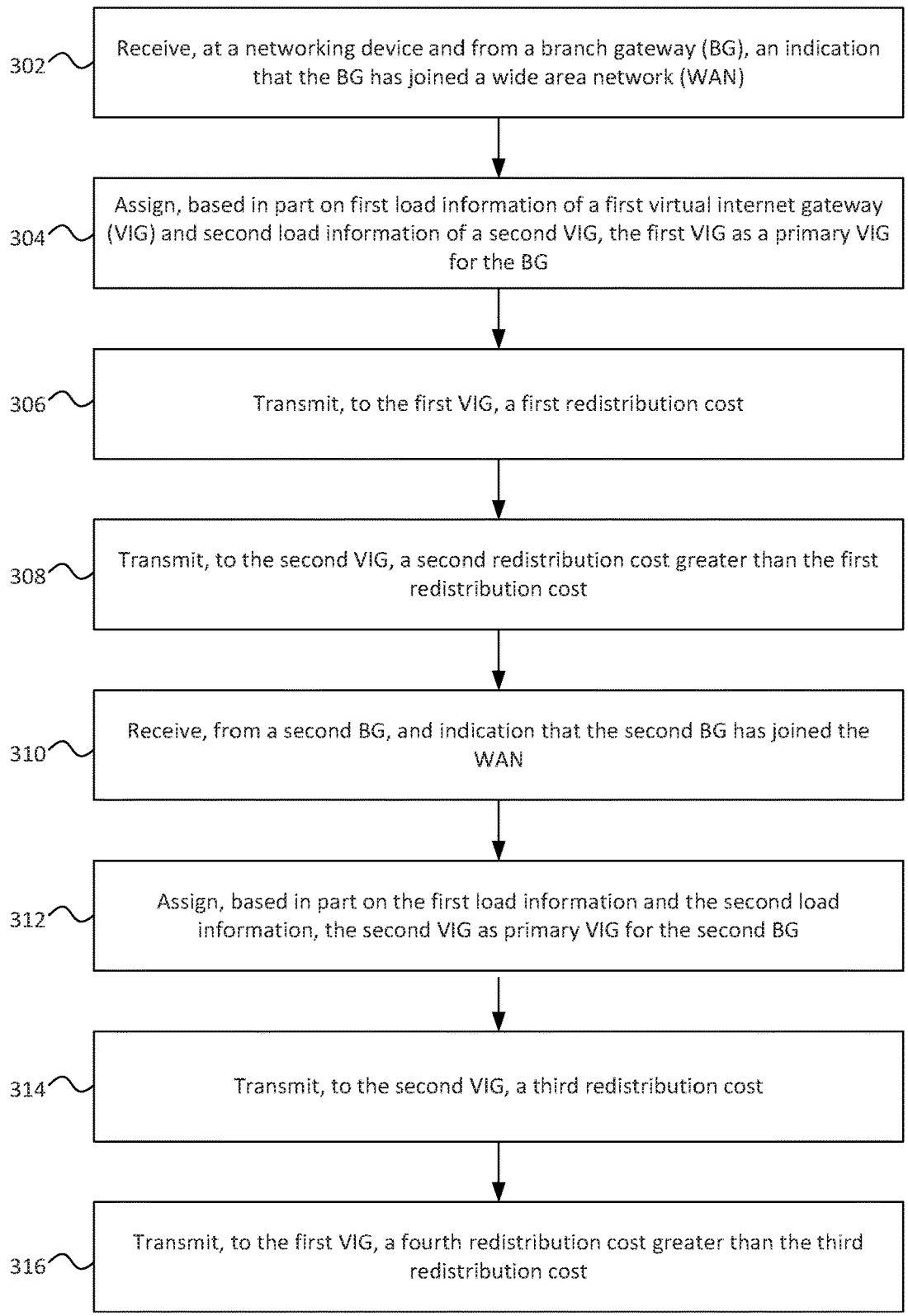
FIG. 3 is a flow chart illustrating steps in a method for dynamically routing network traffic, according to some embodiments.

FIG. 3 is a flow chart illustrating steps in a method 300 for dynamically routing network traffic, according to example embodiments. The method 300 may be performed by a network orchestrator. Further, blocks as disclosed in method 300 may include retrieving, editing, and/or storing files in memory and/or storage that is part of, or is communicably coupled to the network orchestrator. Methods consistent with the present disclosure may include at least some, but not all, of the blocks illustrated in method 300, performed in any sequence, including in parallel.

In block 302 an indication is received from a branch gateway that the branch gateway has joined a WAN. The indication from the branch gateway may be a message requesting an initial configuration be downloaded to the branch gateway from the network orchestrator. The indication from the branch gateway may be received from a secure tunnel that passes through the Internet.

In block 304, based at least in part on first load information of the first VIG and second VIG, the first VIG is assigned as a primary VIG for the branch gateway. In some embodiments, the second VIG is assigned as a secondary VIG for the branch gateway. In some examples, the first load information and the second load information is regularly transmitted to the network orchestrator, and the network orchestrator calculates a load factor for each VIG based on the received first and second load information. In some other examples, each VIG may calculate its own load factor, and transmit the latest load factor to the network orchestrator. In certain examples, the network orchestrator chooses the first VIG as the primary VIG because the first VIG has a lesser load factor than the second VIG.

In block 306, a first redistribution cost is transmitted to the first VIG. In some examples, the first redistribution cost and the second redistribution cost are OSPF redistribution costs. In block 308 a second redistribution cost is transmitted to the second VIG. The second redistribution cost is greater than the first redistribution cost. The first and second redistribution costs are related to subnets that are associated with the BG. In some examples, once the VIGs receive their respective redistribution costs, infrastructure devices in the core site LAN to which the VIGs belong receive advertisements of the first and second redistribution costs and thereafter prefer to route packets destined for the BG through the first VIG since the first redistribution cost is less than the second redistribution cost.

In block 310 an indication is received from a second BG that the second BG has joined the WAN. The indication from the second BG may be a message requesting an initial configuration be downloaded to the second BG from the network orchestrator. The indication from the second BG may be received from a secure tunnel that passes through the Internet.

In block 312, based at least in part on first load information of the first VIG and second VIG, the second VIG is assigned as a primary VIG for the second BG. In some embodiments, the first VIG is assigned as a secondary VIG for the second BG. In some examples, the first load information and the second load information is regularly transmitted to the network orchestrator, and the network orchestrator calculates a load factor for each VIG based on the received first and second load information. In some other examples, each VIG may calculate its own load factor, and transmit the latest load factor to the network orchestrator. In certain examples, the network orchestrator chooses the second VIG as the primary VIG because the second VIG has a lesser load factor than the first VIG.

In block 314, a third redistribution cost is transmitted to the second VIG. In some examples, the third redistribution cost and the fourth redistribution cost are OSPF redistribution costs. In block 316 a fourth redistribution cost is transmitted to the first VIG. The fourth redistribution cost is greater than the third redistribution cost. The third and fourth redistribution costs are related to subnets that are associated with the second BG. In some examples, once the VIGs receive their respective redistribution costs, infrastructure devices in the core site LAN to which the VIGs belong receive advertisements of the third and fourth redistribution costs and thereafter prefer to route packets destined for the second BG through the second VIG since the third redistribution cost is less than the fourth redistribution cost. Simultaneously, packets destined for the first BG (the BG referred to in blocks 302-308), may still be routed through the first VIG.

In this disclosure, example WANs are described as having two (2) VIGs at a core site and one (1) BG at each branch site. While this is a common configuration for real-world WAN deployments, and is also helpful in providing clarity to the concepts of this disclosure, it is not the only configuration contemplated by this disclosure. WANs contemplated by this disclosure may have any number of VIGs per core site, any number of core sites, any number of BGs per branch site, and any number of branch sites. This disclosure contemplates that there may be interconnections between sites that are not described herein, such as branch-to-branch and core-to-core connections. A person having ordinary skill in the art would recognize that the features described in this disclosure could be applied in many network topologies.

Hardware Overview

Figure 4:
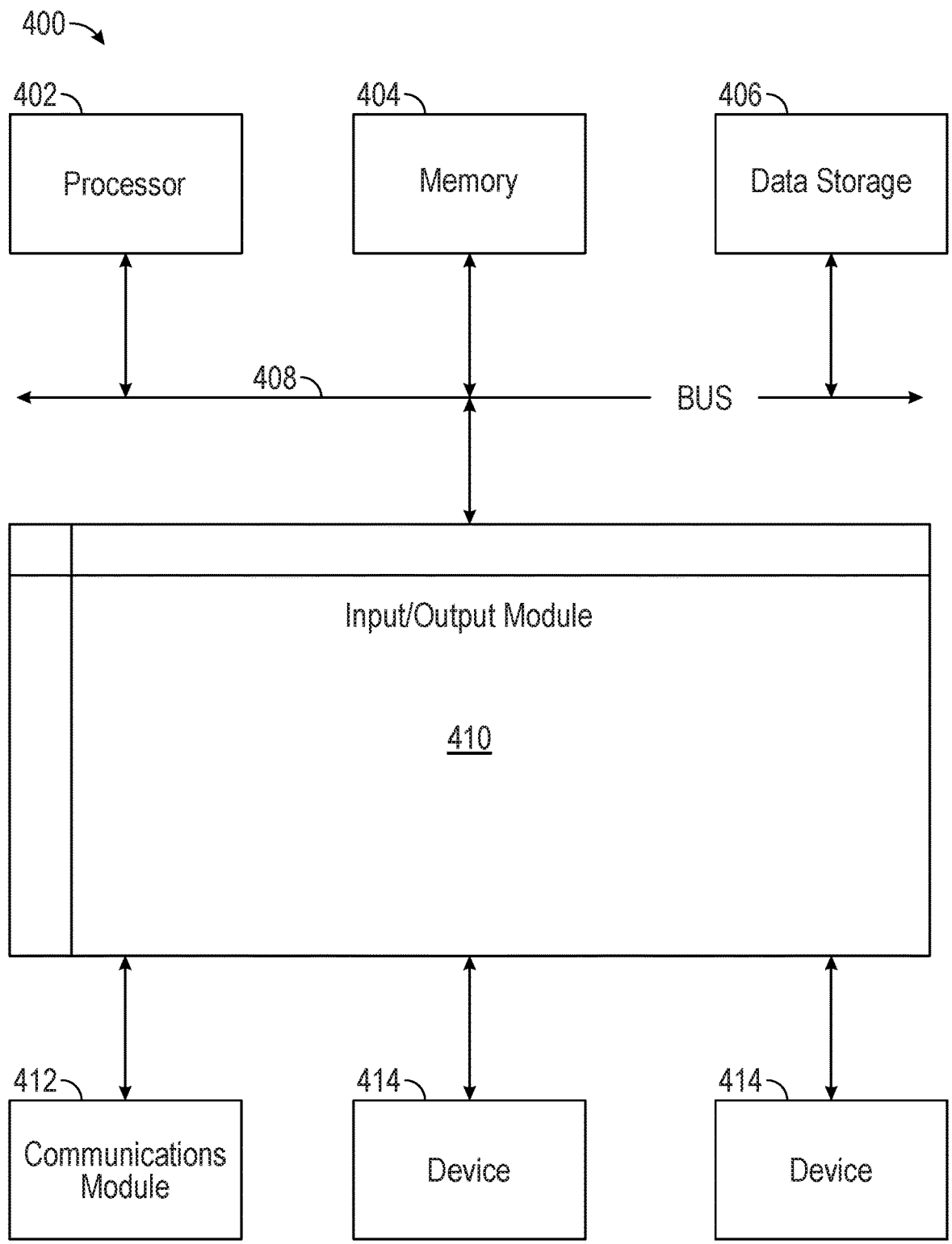
FIG. 4 is a block diagram illustrating an example computer system with which the client and network device of FIG. 1 and the methods of FIG. 2 can be implemented.

FIG. 4 is a block diagram illustrating an example computer system 400 with which the VIGs 120 and 130 and the network orchestrator 140 of FIG. 1 and the method of FIG. 2 can be implemented. In certain aspects, the computer system 400 may be implemented using hardware or a combination of software and hardware, either in a dedicated network device, or integrated into another entity, or distributed across multiple entities.

Computer system 400 includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. Input/output module 410 can be any input/output module. Exemplary input/output modules 410 include data ports such as USB hubs, PCI hubs, etc. The input/output module 410 is configured to connect to a communications module 412. Exemplary communications modules 412 include networking interface cards, such as Ethernet cards and modems. In certain aspects, input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 416 include display devices, such as an LCD (liquid crystal display) monitor, for displaying information to the user.

According to one aspect of the present disclosure, the VIGs 120 and 130 and the network orchestrator 140 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data network device, or that includes a middleware component, e.g., an application network device, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and network devices. A client and network device are generally remote from each other and typically interact through a communication network. The relationship of client and network device arises by virtue of computer programs running on the respective computers and having a client-network device relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires forming bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A networking device, comprising:
   processing circuitry; and
   memory including instructions that, when executed by the processing circuitry, cause the networking device to:
   receive, from a branch gateway (BG), an indication that the BG has joined a wide area network (WAN);
   assign, based in part on first load information of a first virtual internet gateway (VIG) and second load information of a second VIG, the first VIG as a primary VIG for the BG;
   transmit, to the first VIG, a first redistribution cost; and
   transmit, to the second VIG, a second redistribution cost greater than the first redistribution cost;
   receive, from a second BG, an indication that the second BG has joined the WAN;
   assign, based in part on the first load information and the second load information, the second VIG as a primary VIG for the second BG;
   transmit, to the second VIG, a third redistribution cost; and
   transmit, to the first VIG, a fourth redistribution cost greater than the third redistribution cost; and
   assign the first VIG as a secondary VIG for the second BG, wherein a third route passes between the second VIG and the second BG, and a fourth route passes between the first VIG and the second BG, and wherein the third redistribution cost and the fourth redistribution cost indicate that packets addressed to pass addressed to pass between the BG and one of the first VIG and the second VIG should preferably be routed through the second route.

2. The networking device of claim 1, wherein the instructions further cause the networking device to assign the second VIG as a secondary VIG for the BG.

3. The networking device of claim 2, wherein a first route is established that passes between the first VIG and the BG, and a second route is established that passes between the second VIG and the BG.

4. The networking device of claim 3, wherein the first redistribution cost and the second redistribution cost indicate that packets addressed to pass between the BG and one of the first VIG and the second VIG should preferably be routed through the first route.

5. The networking device of claim 1, wherein the first VIG and the second VIG are OSPF neighbors to a core router of a core site local area network (LAN).

6. A wide area network (WAN), comprising:
   a first virtual internet gateway (VIG);
   a second VIG;
   a branch gateway (BG); and
   a network orchestrator to:
   receive, from the BG, an indication that the BG has joined the WAN;
   determine a first load factor for the first VIG based on load information of the first VIG;
   determine a second load factor for the second VIG based on load information of the second VIG;
   select a primary VIG and a secondary VIG for the BG based, in part, on the first load factor and the second load factor;
   transmit, to the primary VIG, a first redistribution cost;
   transmit, to the secondary VIG, a second redistribution cost, greater than the first redistribution cost;
   receive, from a second BG, an indication that the second BG has joined the WAN;
   determine an updated first load factor for the first VIG based on updated load information of the first VIG;
   determine an updated second load factor for the second VIG based on updated load information of the second VIG;
   select a primary VIG and secondary VIG for the second BG based, in part, on the updated first load factor and the updated second load factor;

transmit, to the primary VIG for the second BG, a third redistribution cost; and transmit, to the secondary VIG for the second BG, a fourth redistribution cost greater than the third redistribution cost.

7. The WAN of claim 6, wherein selecting the primary VIG for the BG is based, in part, on whether a skew between the first VIG and the second VIG is greater than a skew threshold.

8. The WAN of claim 6, wherein a first route passes between the BG and the primary VIG and a second route passes between the BG and a secondary VIG, and
wherein the first redistribution cost and the second redistribution cost indicate that packets addressed to pass between the BG and one of the primary VIG and the secondary VIG should preferably be routed through the first route.

9. The WAN of claim 6, wherein a third route passes between the second BG and the primary VIG for the second BG, and a fourth route passes between the second BG and the secondary VIG for the second BG.

10. The WAN of claim 6, wherein the primary VIG for the BG is the first VIG and the primary VIG for the second BG is the second VIG.

* * * * *

UNITED STATES PATENT AND TRADEMARK OFFICE
CERTIFICATE OF CORRECTION

Page 1 of 1

PATENT NO. : 10,855,575 B2
APPLICATION NO. : 16/294392
DATED : December 1, 2020
INVENTOR(S) : Isaac Theogaraj et al.

It is certified that error appears in the above-identified patent and that said Letters Patent is hereby corrected as shown below:

In the Claims

Column 16, Line 23, delete "addressed to pass"

Column 16, Line 25, replace "second" with -- third --

Column 16, Line 65, insert -- a -- between "and" and "secondary"

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*